United States Patent [19]

Schneider et al.

[11] 4,279,561
[45] Jul. 21, 1981

[54] WORKPIECE CONVEYOR DEVICE FOR AN AUTOMATED PRESS LINE

[75] Inventors: Franz Schneider, Göppingen; Burkhard Schumann, Ottenbach; Karl Maier, Kuchen; Herbert Höhn, Göppingen, all of Fed. Rep. of Germany

[73] Assignee: L. Schuler GmbH, Goppingen, Fed. Rep. of Germany

[21] Appl. No.: 953,783

[22] Filed: Oct. 23, 1978

[30] Foreign Application Priority Data

Oct. 21, 1977 [DE] Fed. Rep. of Germany ....... 2747237

[51] Int. Cl.³ .................. B66F 11/00; B30B 15/00
[52] U.S. Cl. ................................ 414/591; 414/751; 414/753; 72/7; 100/207
[58] Field of Search ............ 414/751, 753, 591; 198/486, 339; 100/207; 72/7

[56] References Cited

U.S. PATENT DOCUMENTS

| 3,618,349 | 11/1971 | Roch ............................................. 72/7 |
| 3,879,979 | 4/1975 | Arai et al. .................................... 72/7 |
| 4,037,730 | 7/1977 | Fetzer et al. .............................. 414/591 |
| 4,125,072 | 11/1978 | Maier et al. .............................. 100/207 |

*Primary Examiner*—Leslie J. Paperner
*Assistant Examiner*—L. E. Williams
*Attorney, Agent, or Firm*—Craig and Antonelli

[57] ABSTRACT

In press line operations, a workpiece conveyor device is necessary to carry workpieces from one press to another. Preferably, this conveyor should be readily removable for repairs, adaptable to a large number of presses, and readily reprogrammable to adapt to a variety of workpieces. To achieve this, a conveyor is provided having a cross member mounted on a movable carriage which moves along a track on a frame bridging the intermediate space between two presses. Horizontal movement of the carriage along the track, vertical movement of the cross member on the carriage, and movement of a positioning device for the workpieces is provided by setting drives controlled by a continuous-path numerical control unit. For repairs, the entire frame can be moved out of the intermediate space in a direction at a right angle to the direction of workpiece travel.

7 Claims, 3 Drawing Figures

WORKPIECE CONVEYOR DEVICE FOR AN AUTOMATED PRESS LINE

FIELD OF THE INVENTION

This invention relates generally to a workpiece conveyor device and, more specifically, to a workpiece conveyor device for automation of a press line with a movable conveyor carriage in the space between two presses.

DESCRIPTION OF THE PRIOR ART

German Offenlegungsschrift No. 2,544,203 shows one example of a prior art workpiece conveyor device for an automated press line that bridges an intermediate space between two presses. A conveyor carriage is provided in operational connection with a cross member with supports at the ends that can be adjusted in their position. Each of these supports has paired opposed controllable gripping elements, pointing in opposite directions. Between the presses there are lay-off stations for the workpieces that are to be conveyed, and a positioning stage between the said lay-off stations.

These known workpiece conveyors are driven directly by the main drives of the presses, so that the presses are mutually synchronized and work continuously. Workpiece conveyors of this kind can thus only be made in the overall design of a synchronized press line, together with the presses. These workpiece conveyors cannot generally be used to re-equip existing non-automated press lines because in the great majority of cases it is not possible to have a power take-off from the presses to the conveyors. Further, the presses of the press lines often cannot be driven in synchronous continuous operation because the electric drives are not typically designed for such a load.

Another example of a prior art workpiece conveyor for automation of a press line is described in German Offenlegungsschrift No. 2,218,966. Here there is a loading and unloading device with grip elements associated with each press which have their own drives that are independent of the main drive of the press. But they are connected by a conveyor belt that has to be disposed between the presses. In this device, therefore, it is necessary to dispose a loader and an unloader as well as a belt between two presses of a press line, to manage the intermediate space. German Offenlegungsschrift No. 1,463,080 also shows such a device, but as in German Offenlegungsschrift No. 2,544,203 it is driven by the main drive of the press.

A workpiece conveyor is also shown in German Offenlegungsschrift No. 2,417,131 where the whole intermediate space between the presses is covered by a track on which a conveyor carriage can be moved horizontally. On this conveyor carriage there are pairs of gripping tongs that can be raised and lowered in opposed directions, serving on one side for unloading one press and on the other side for loading the next press. As is customary, there is only one positioning stage or turning stage provided between the presses. The workpiece conveyor is driven by separate drives, controlled by a numerical control program control. Such NC program controllers require considerable manual programming effort (e.g. see also German Offenlegungsschrift No. 2,218,966). It is also a disadvantage in this known conveyor device that only two pairs of gripping tongs are available, with very long paths of travel.

SUMMARY OF THE INVENTION

It is, therefore, an object of the present invention to provide a workpiece conveyor that can be combined with an existing press without difficulty, wherein the workpiece conveyor has an easily and automatically re-programmable control, is suitable for large or small intermediate spaces, and can be moved out from the intermediate space and readily re-equipped.

To accomplish these and other objects, a workpiece conveyor is provided for automation of a press line between two presses having a cross member mounted on a movable conveyor carriage in the intermediate space between two presses. The cross member is provided with adjustable supports at each end which have opposed controllable gripping elements for gripping the workpieces. The carriage, along with the cross member, is located on a frame which bridges the intermediate space, and the carriage can be moved horizontally on a track in the frame by a first setting drive. Second and third setting drives are also provided, respectively, for vertical movement of the cross member and for movement of a positioning device for the workpieces. All of the setting drives are controlled by a continuous-path numerical control unit. The frame can be moved out of the intermediate space in a direction which is at a right angle to the direction of workpiece travel.

One advantage of the workpiece conveyor of the present invention resides in its adaptability to already existing press lines that were previously driven manually and which present a relatively large distance between the individual presses for intermediate stacking of the workpieces, for tool exchange etc. By suitable selection of the cross member, the intermediate space between the presses is substantially bridged, so that the travel path can be kept relatively short without need to use a conveyor belt. Since the supporting frame can be moved out of the intermediate space, the tools, which can be moved out of the tool space toward the front of the presses in question, can be exchanged in the customary way without difficulty. Also, because the possibilities of the simple programming, e.g. with solid state storage cassettes, the workpiece conveyor, in an ordinary exchange of tools immediately in the course of movement, can be adapted to the workpiece to be produced with the new tools.

BRIEF DESCRIPTION OF THE DRAWINGS

The workpiece conveyor of the present invention will be discussed with reference to the detailed description and drawings wherein.

DETAILED DESCRIPTION

Figure 1:
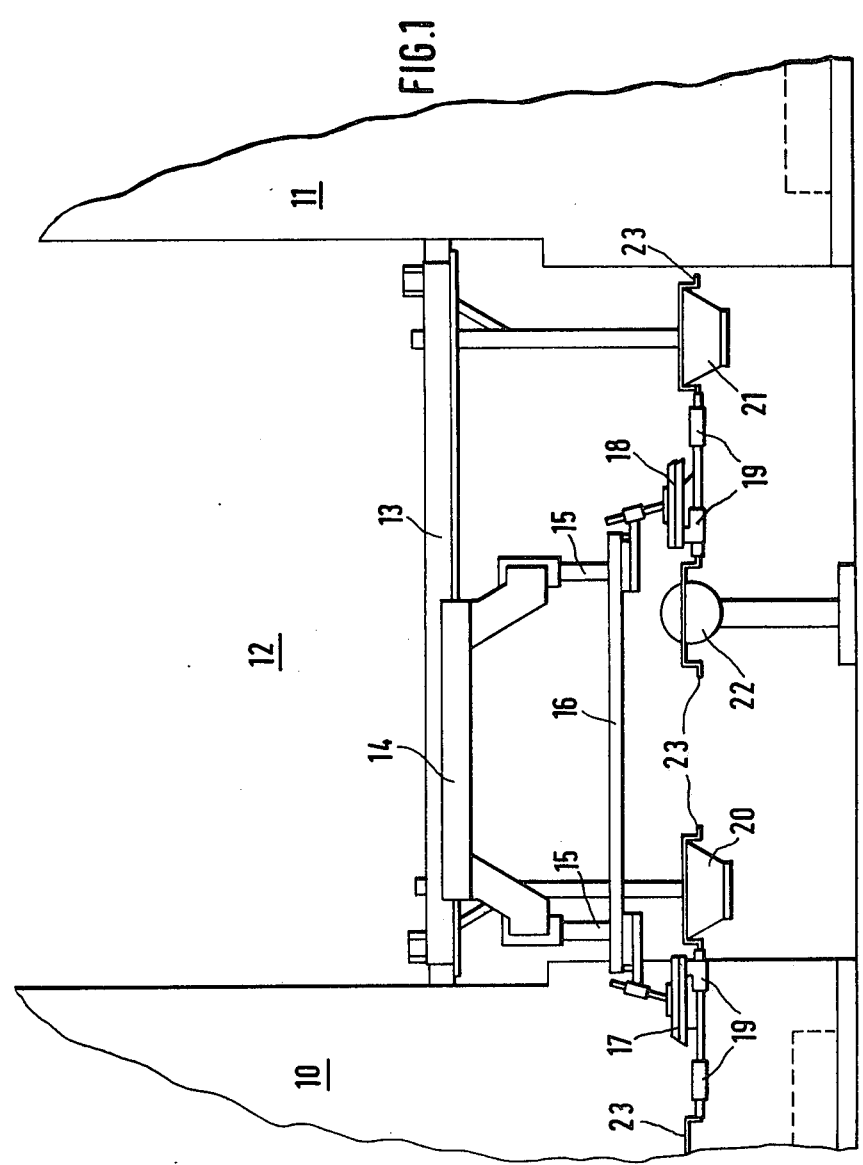
FIG. 1 is a side elevational view of a press line in accordance with the present invention.
Figure 2:
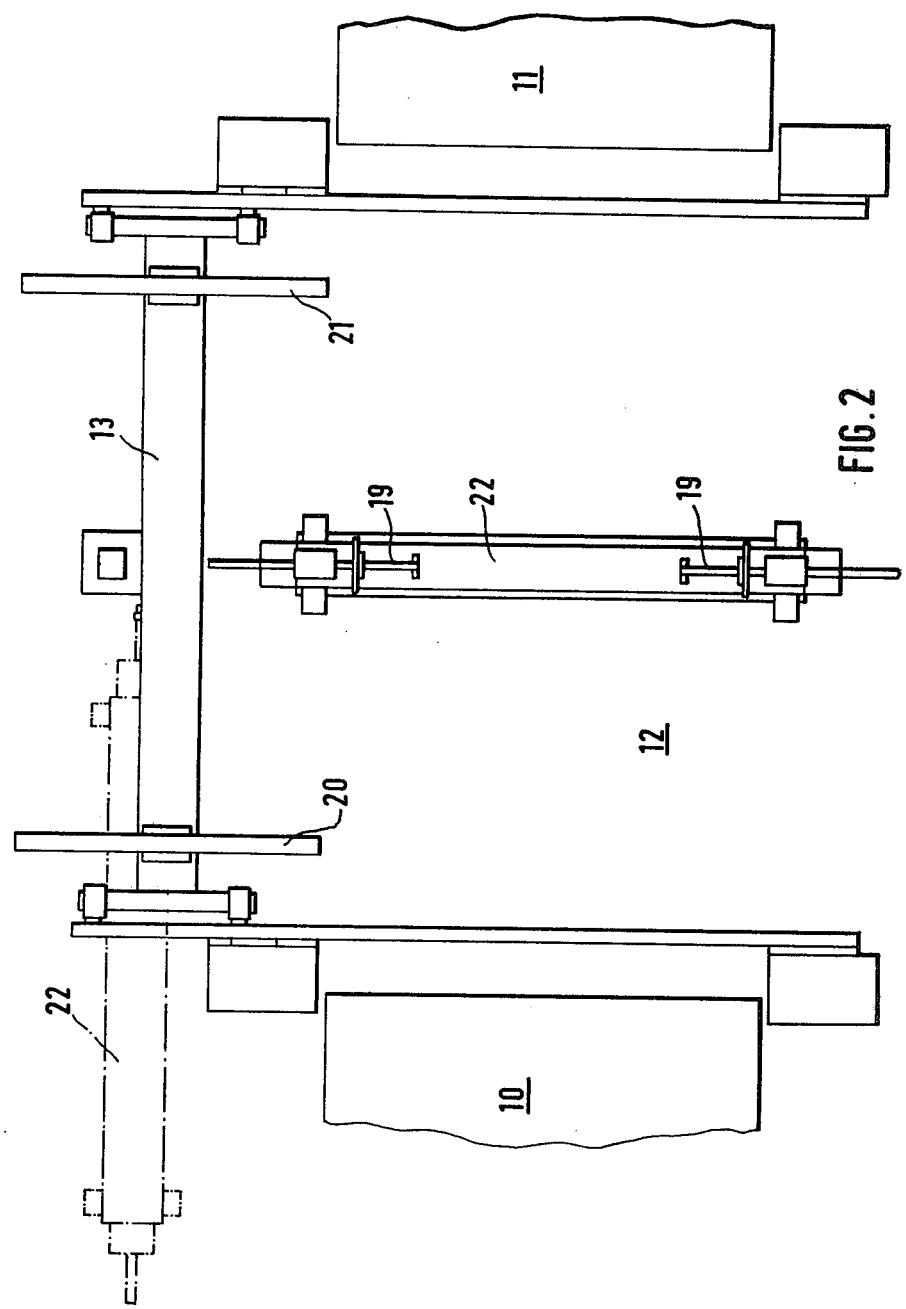
FIG. 2 is a top view according to FIG. 1.

Referring now to the drawings, and in particular to FIGS. 1 and 2, a press line is shown having a first press 10 and a second press 11. The intermediate space 12 between the two presses 10 and 11 is bridged by a supporting frame 13, on which a conveyor carriage 14 can be horizontally moved on a track that is not shown in detail. On the conveyor carriage 14 there is disposed a cross member 16 parallel to the axis of the frame 13, via a guide element 15 which transmits a raising and lowering motion. At the ends of cross member 16 supports 17 and 18 are provided that are disposed to be adjustable in position. Supports 17 and 18 each respectively have paired opposed controllable gripping elements 19 pointing in opposite directions, advantageously made as gripping tongs.

Directly after the first press 10 there is a first lay-off stage 20, and directly ahead of the second press 11 there is a second lay-off stage 21 which stages are directly connected with supporting frame 13. Between the two lay-off stages 20 and 21 there is a positioning stage 22. The workpieces 23 that are to be conveyed are moved respectively from stage to stage if a conveying stroke is executed. As shown in FIG. 2, the positioning stage 22 is also provided with gripping elements 19 and can be brought out of intermediate space 12 if the press line is to be re-equipped, i.e. furnished with other tools. Removal from the intermediate space 12 is generally necessary because tool exchange in presses of older structural types, especially those with manually serviced press lines, can only be done from the front of the press, hence from the intermediate space 12.

Figure 3:
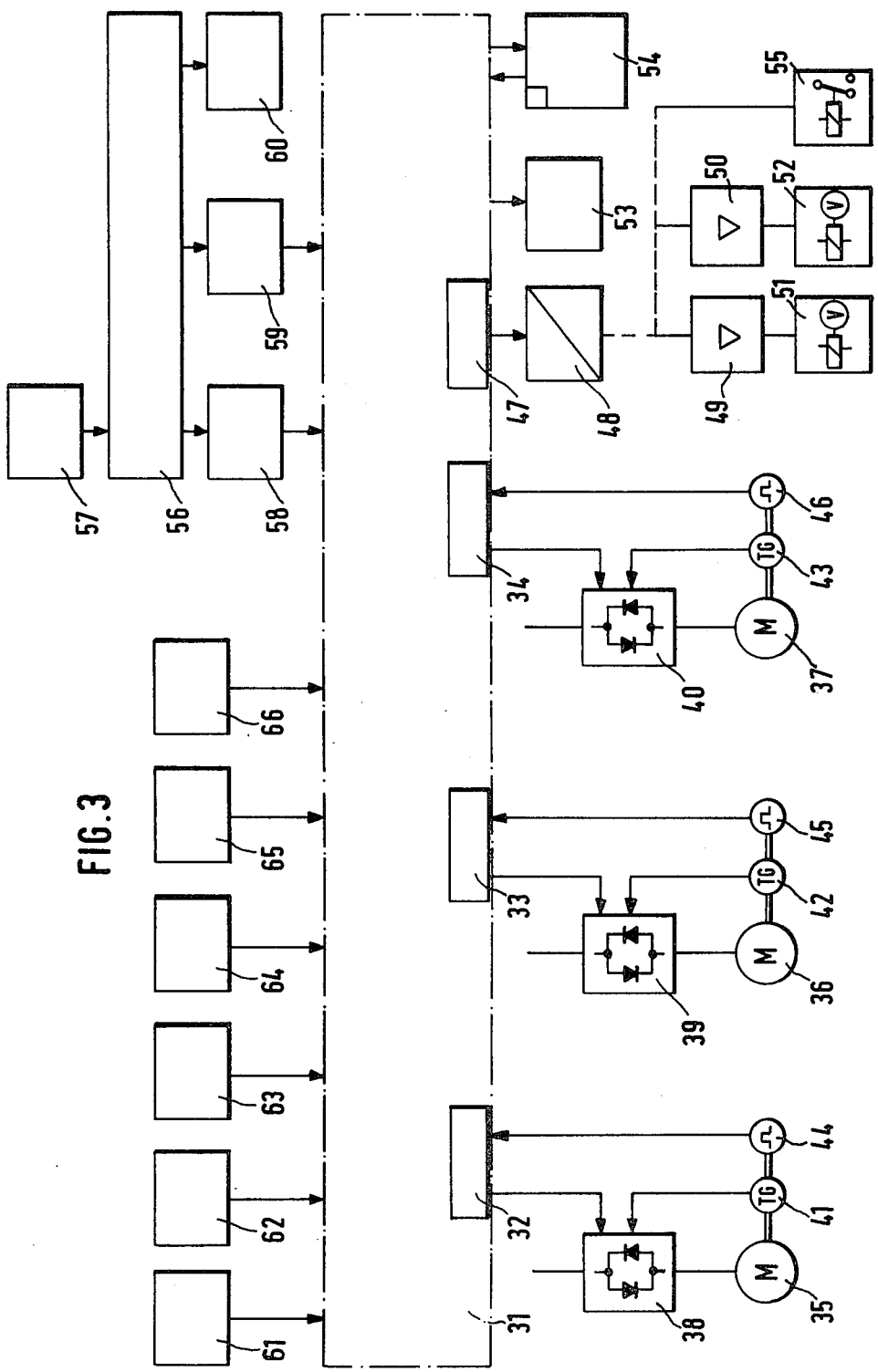
FIG. 3 is a block circuit diagram of a program controller for the press line of FIGS. 1 and 2 in accordance with the present invention.

Referring now to FIG. 3, the core of the program controller shown there is a continuous-path numerical control unit 31 (hereinafter referred to as CNC 31) which is composed in a known way of a process computer and storage units. The Sinumerik Mate M, manufactured by Siemens specifically for drilling and milling machines is one commercially available unit which can be used for the CNC 31. On the output side of the CNC 31 there are three position controls 32, 33, and 34, integrated into the CNC control 31, with which there are respectively associated adjusting drives 35, 36, and 37. The adjusting drive 35 affects the horizontal movement of the common conveyor carriage 14, while adjusting drive 36 controls the vertical movement of the gripping elements 19 disposed on the conveyor carriage 14. Adjusting drive 37 controls the setting of positioning stage 22.

The position regulating circuits of adjusting drives 35, 36, and 37 are all constructed in the same manner, each having a controlled rectifier 38, 39 and 40 coupled thereto which receives a rated value from the respective position controls 32, 33, and 34 and an actual value, e.g. speed, from tachometer generators 41, 42 and 43 belonging to the respective setting drives 35, 36, and 37. Further, the setting drives 35, 36, and 37 have incremental pulse transmitters 44, 45, and 46 associated with them, which report the actual position value to position controls 32, 33, and 34. The rated position is thereby determined by the CNC control 31, compared with the actual position, and a resulting signal subsequently reaches the controlled rectifiers 38, 39, and 40. In supplement to the position controls 32, 33, and 34, the CNC control 31 presents supplementary signal outputs 47 which are connected via a decoder 48 and amplifiers 49 and 50 with setting members 51 and 52. Setting members 51 and 52 can be valves, for example, which open and close gripping elements 19. Numerical indicator 53 can show typical rated values for the workpiece conveyor.

The CNC control 31 has an automatically functioning input such as punched tape, magnetic tape cassettes or a solid state storage means associated with it so that the program can be changed without difficulty by simple exchange of the tape, cassette or solid state storage means. By means of an interlocking switch 55 which is controlled via the decoder 48 from the signal outputs 47, the actual press controls are so locked that a start-up of press 10 and 11 will be prevented, as long as one of gripping elements 19 is in the immediate vicinity of the press.

The input of the CNC control 31 has, on the one hand, an adapting and connecting control 56 whose essential task consists in connection of the press control (not shown) with the CNC control 31. For this, a command input 57 is associated with the adapting and connecting control 56, to which input signals typical of press operation, e.g. setting signals, and tool load-unload, are applied. The Logitrol control system described in General Electric brochure GEA-9478A is one example of a unit which can be used as the adapting and connecting control 56. Connected after the adaptation control 56 but ahead of CNC control 31 is a release stage 58 through which setting drives 35, 36 and 37 are started, and an end position limiting stage 59 through which overriding of the outermost end positions by carriage 14 or damage and disturbance are prevented. At the same time a signalling stage 60 is controlled from adaptation control 56, which indicates the function course of the press line, by means of light emitting diodes inside a function-flow diagram.

CNC control 31 further contains directly associated input stages: a preselector stage 61 for the type of drive; a coordinates input stage 62 for points to be approached by setting drives 35, 36, and 37; a track speed selection stage 63; a residence time input stage 64; an additional function selection stage 65; and an interpolation input stage 66. The cycle of movement of workpiece conveyor can be managed manually, if desired, via these stages 61 to 66.

With the drive type preselection stage 61, organizing operation, continuous operation, etc. is preselected. The coordinates input stage 62 is used to determine the points to be approached. By means of interpolation input stage 66, it is determined in what way the preselected points are to be approached, either directly linearly, i.e. by the shortest path, or on arcs or according to the type of track control.

The automatically functioning input 54 provides the ability to program the system to use with particular types of workpieces simply by exchanging the stored program therein. Thus, the respective drives 35, 36, and 37 as well as the valves 51 and 52 can be operated in a particular manner according to particularities of a given type of workpiece based upon the programmed operation set by the automatically functioning input 54 in conjunction with the inputs 58 to 66.

In operation, the first press 10 is supplied with a workpiece 23 by means of a loader (not shown). In the usual way, the workpiece 23 is shaped in a drawing operation by the press 10. At about a 270° crank shaft angle, a signal now arrives via command input 57 on the adaptation control 56, whereby the release stage 58 is set. The ideal position as determined by the CNC control 31 is now taken through the setting drives 35, 36, and 37, whereby the workpiece 23 is engaged by gripping elements 19 and removed from the press 10, to be laid off on stage 20. Here the setting members 51 and 52 are functionally controlled by supplementary signal outputs 47. With manual programming, for example, via residence time input stage 64, a residence time is established in which the workpiece 23 is securely held by gripping elements 19, before the conveyor carriage 14 is moved further by drives 35, 36, and 37. With movement of the workpiece 23 from the first press 10, a workpiece 23 is simultaneously moved into the second press 11 whereby the stage 20 is provided after the first press 10 and the stage 21 is provided ahead of the second press 11. Further there is a positioning stage 22 between the two stages 20 and 21. By means of positioning stage 22, the workpiece 23 can be swung into any position between 0° and 360°, depending upon the given processing requirements.

It is to be understood that the above-described arrangements are simply illustrative of the application of the principles of this invention. Numerous other arrangements may be readily devised by those skilled in the art which embodies principles of the invention and falls within its spirit and scope.

We claim:

1. An adjustable workpiece conveyor device suitable for automation of a plurality of different press lines by providing a movable conveyor carriage in an intermediate space between two presses, said movable carriage being coupled to a cross member having adjustable supports at the ends of the cross member, said supports having paired opposed controllable gripping elements for gripping the workpieces which point in opposite directions, and wherein between the presses there are located at least two lay-off stages for the workpieces that are to be conveyed from one press to the other press, and a positioning stage, of which stages at least two can be spanned by the cross member, comprising:

a first setting drive for moving the conveyor carriage horizontally on an adjustable supporting frame having a track that bridges the whole intermediate space;

a second setting drive coupled between the cross member and the conveyor carriage for a raising and lowering of the cross member; and a third setting drive coupled to the positioning stage to operate said positioning stage;

wherein the first, second and third setting drives are controlled by a continuous-path numerical control unit, wherein the supporting frame is movable from the region of the intermediate space in a direction which is at a right angle to the direction of conveying the workpieces, and wherein the positioning stage can be moved out from the intermediate space at an angle to the direction of converging of the workpieces to allow for access to the presses from the input or feed sides through the intermediate space for changing press tools, and wherein the workpiece conveyor device is adaptable to a plurality of different press lines by the removability of the support frame from one intermediate space to another, by the adjustability of the length of the support frame to fit a desired intermediate space, by the selection of the cross member to span at least two stages in the desired intermediate space, and by selection of a program for the continuous-path numerical control unit for the particular press line to which the workpiece conveyor device is being connected.

2. A workpiece conveyor device as in claim 1, wherein the lay-off stages are disposed on the frame.

3. A workpiece conveyor device as in claim 1, wherein the continuous-path numerical control unit is provided with an automatically functioning input for providing a program of operation based upon the features of the particular workpiece.

4. A workpiece conveyor as in claim 1, wherein the continuous-path numerical control unit includes first, second and third position control units coupled, respectively, to the first, second and third setting drives to provide the rated values for the respective drives.

5. A workpiece conveyor as in claim 4, further including means coupled between the setting drives and the position control units to provide the actual position of the setting drives to the position control units so that the position control units can compare the actual positions with the rated positions and provide resultant signals to the drive settings based upon the comparison.

6. A workpiece conveyor device as in claim 1, further including valves coupled between the continuous-path numerical control unit and the opposed controllable gripping elements so that the gripping elements can be controlled by the continuous-path numerical control unit.

7. A workpiece conveyor device as in claim 1, wherein the continuous-path numerical control unit is provided with an adapting and connecting input for coupling press operation control signals to the continuous-path numerical control unit.

* * * * *